Nov. 28, 1950 R. B. HOFFMAN ET AL 2,531,433

TIME SHARING DUPLEX COMMUNICATION SYSTEM

Filed March 1, 1947 3 Sheets-Sheet 1

INVENTORS.
Ross B. Hoffman
BY Robert C. Ferrar
Percy P. Lantzy
ATTORNEY

Nov. 28, 1950 R. B. HOFFMAN ET AL 2,531,433

TIME SHARING DUPLEX COMMUNICATION SYSTEM

Filed March 1, 1947 3 Sheets-Sheet 2

INVENTORS.
Ross B. Hoffman
BY Robert C. Ferrar
Percy P. Lantzy
ATTORNEY

INVENTORS.
Ross B. Hoffman
BY Robert C. Ferrar
Percy P. Lantzy
ATTORNEY

Patented Nov. 28, 1950 2,531,433

UNITED STATES PATENT OFFICE 2,531,433

TIME SHARING DUPLEX COMMUNICATION SYSTEM

Ross B. Hoffman, Glen Ridge, and Robert C. Ferrar, New Providence, N. J., assignors to Federal Telephone and Radio Corporation, New York, N. Y., a corporation of Delaware Application March 1, 1947, Serial No. 731,770

8 Claims. (Cl. 250—9)

The present invention relates to communication systems and, more particularly, to signalling systems wherein each of a plurality of communicating stations may transmit and receive radio signals. The invention herein disclosed utilizes to advantage two-frequency communication wherein duplex operation is achieved by time sharing transmitter-receiver circuits at one station of the system.

One object of the invention, therefore, is to provide a simplified arrangement for duplex operation between communicating stations.

Another object is to provide a time sharing transmitter-receiver employing a relatively narrow communication band.

A further object is to provide a two carrier frequency duplex communications system in which the frequency separation between the two carriers may be very small.

Still another object is to provide a two carrier frequency duplex communications system which is substantially undisturbed by thermal noise and other interference.

According to our present invention, we have provided a simplified signalling system well suited for such operations utilizing two carrier frequencies which may be very close together. In this system, we provide at one of the stations, ordinarily a fixed central station, an independent transmitter and receiver, and we provide the other station, ordinarily the mobile field station, with a corresponding transmitter and receiver which are interdependent as hereinafter disclosed. We provide the transmitter of one of the stations, ordinarily the mobile station, with means for automatically keying the transmitter when signals are being transmitted by it so that the transmitter and receiver at the latter station will share the time, and the transmission will occur in timed pulses. Preferably the keying frequency for this purpose is at a high audio rate, in the order of 6000 or 8000 cycles, and in a manner to come within a desired narrow band of frequencies. It will be understood, however, that other keying frequencies might be employed if desired. When the transmitter at the station containing the keying means is transmitting, the receiver at the same station is blocked; when the transmitter is not transmitting, the receiver is engaged in full time reception of signals.

To minimize interference at the receiver of the station which is not provided with the keying device, we preferably provide means for rendering its receiver inoperative during the time intervals between pulses of signals from the transmitter of the other station.

The foregoing and other objects and features of our invention will be better understood from the following detailed description and the accompanying drawings, in which.

Figures 1, 2:
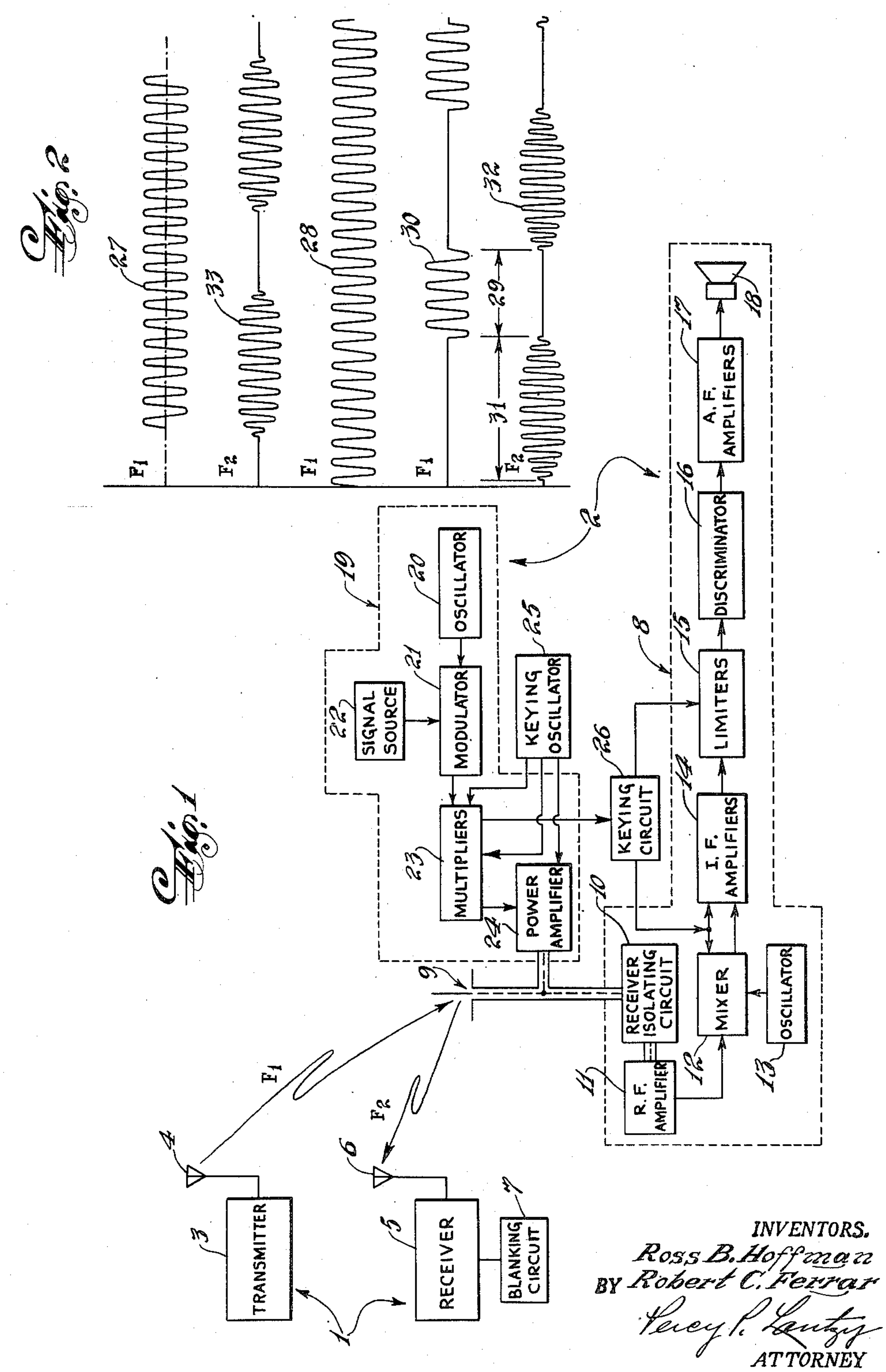
Fig. 1 shows in diagrammatic form a communication system according to our invention.
Fig. 2 is a graphical illustration showing waveforms and periods of signals in the operation of the system of Fig. 1.

In Fig. 1, the equipment designated generally by numeral 1 is the equipment at one station, termed the "Fixed Station," and the equipment designated generally by numeral 2 represents the equipment at another station identified as the "Mobile Station." The so-called fixed station will ordinarily be the central station of the communication system and the mobile station will ordinarily be one of a number of field stations; it being immaterial for operational purposes which of the two stations shown moves, or whether either of them is mobile.

In the preferred embodiment shown, voice signals are adapted to be transmitted by frequency modulated carrier signals. At the fixed station 1, a conventional frequency modulation transmitter 3 is shown in block form. The transmitter 3 may include the usual carrier frequency oscillator, modulator connected at the oscillator output, a voice pickup or microphone connected to the modulator in a well known manner for frequency modulating the carrier signal, a number of frequency multiplying stages connected in tandem at the output of the modulator, and a power amplifier connected between the output of the last multiplier, and a transmitting antenna 4 which radiates signals on the carrier frequency $F_1$.

The frequency modulation receiver 5 at the fixed station may also be substantially of conventional form. For example, it may comprise the usual receiving antenna 6, a radio frequency amplifier, a mixer connected at the output of the radio frequency amplifier, a carrier frequency oscillator connected to the mixer in conventional manner; an intermediate frequency amplifier connected at the output of the mixer for amplifying the intermediate frequency, limiters connected at the output of the intermediate frequency amplifier, in the manner conventional in frequency modulation receivers; a discriminator stage connected at the output of the limiters, an audio frequency amplifier connected at the output of the discriminator and a loudspeaker or other utilization device connected at the output of the audio frequency amplifier.

A blanking device 7, however, is preferably associated with the receiver 5, and more specifically the limiters thereof in a manner and for a purpose which will be more fully explained hereinafter.

At the mobile station 2, the receiver 8 substantially enclosed by broken lines in Fig. 1 is likewise for the most part a conventional frequency modulation receiver comprising an antenna 9, receiver isolating circuit 10, radio frequency amplifier 11, a mixer 12 connected to its output, an oscillator 13 connected to the mixer, an intermediate frequency amplifier 14 of one or more stages connected to the output of the mixer, limiters 15 connected to the output of the intermediate frequency amplifier, a discriminator 16, audio frequency amplifiers 17, and a speaker or other utilization device 18 connected at the output of the audio frequency amplifiers.

The frequency modulation transmitter 19 of the mobile station, also substantially enclosed by broken lines, is similar in many respects to the transmitter of the fixed station 1. It comprises a carrier frequency oscillator 20, a modulator 21, a signal source 22 such as a microphone connected to the modulator, a number of frequency multiplying stages 23 at the output of the modulator, and a power amplifier 24 connected at the output of the last multiplier stage. If desired and as shown, the antenna 9 may be used in common by both the transmitter 19 and the receiver 8, and it is for this reason that the receiver isolating circuit 10 is used. The details of this circuit will be described hereinafter in connection with Fig. 3. It should be understood, of course, that separate antennas may be used for the transmitter and receiver if desired.

To provide for time sharing operation of the transmitter and receiver at the mobile station 2, there is connected into the system a keying oscillator 25. This oscillator is connected to three stages of the transmitter as will be explained in detail in connection with Fig. 3. The purpose of keying three stages, one of the multipliers, the driver at the output of the last multiplier and the final amplifier, is to obtain complete keying of the transmitter output. This avoids leakage of signal to the antenna and also suppresses undesired side bands. The oscillator 25 is preferably tuned to a frequency of about 8000 cycles per second, which is at substantially twice the upper limit of the audio frequency range usually transmitted in communication systems of the present type.

Regardless of what percentage of the transmit-receive cycle the transmitter is rendered transmitting by oscillator 25, the receiver at the mobile station will be made operative during the remainder of the cycle, and inoperative during those time intervals when the transmitter is permitted to radiate signals. This is accomplished by the keying circuit 26 which receives excitation signals from the keyed multiplier stage of the transmitter and delivers output to certain elements of the receiver, such for example as the second limiter, the intermediate frequency amplifier 14, and mixer 12. By the action of this keying circuit, the parts of the output wave of the keying oscillator 25 which render the transmitter inoperative, are used to render the receiver operative; and the receiver is rendered inoperative during the remainder of the time.

The waveforms sketched in Figure 2 illustrate the signals which are of particular importance in the present communications systems. The frequency modulated wave 27, which is essentially at the carrier frequency $F_1$, is representative of the signals emitted from the fixed station transmitter 3, and, when the transmtiter 19 of the mobile installation 2 is not being used in duplex operation, such a frequency modulated wave may appear in the R. F. amplifier 11 of mobile receiver 8 as the wave 28. When, however, duplex operation necessitates time sharing of transmission and reception at the mobile station, the receiver isolating circuit permits only those portions of the wave 27 to reach the R. F. amplifier which occur during time intervals 29, so that a wave such as 30 appears in R. F. amplifier 11. During the remainder, 31, of a transmit-receive cycle, the transmitter 19 delivers an output signal 32, the wave-shape of which will be more fully explained hereafter. This frequency modulated and keyed signal is of essentially a carrier frequency $F_2$ and appears as a wave 33 in the input of the fixed station receiver 5.

Figure 3:
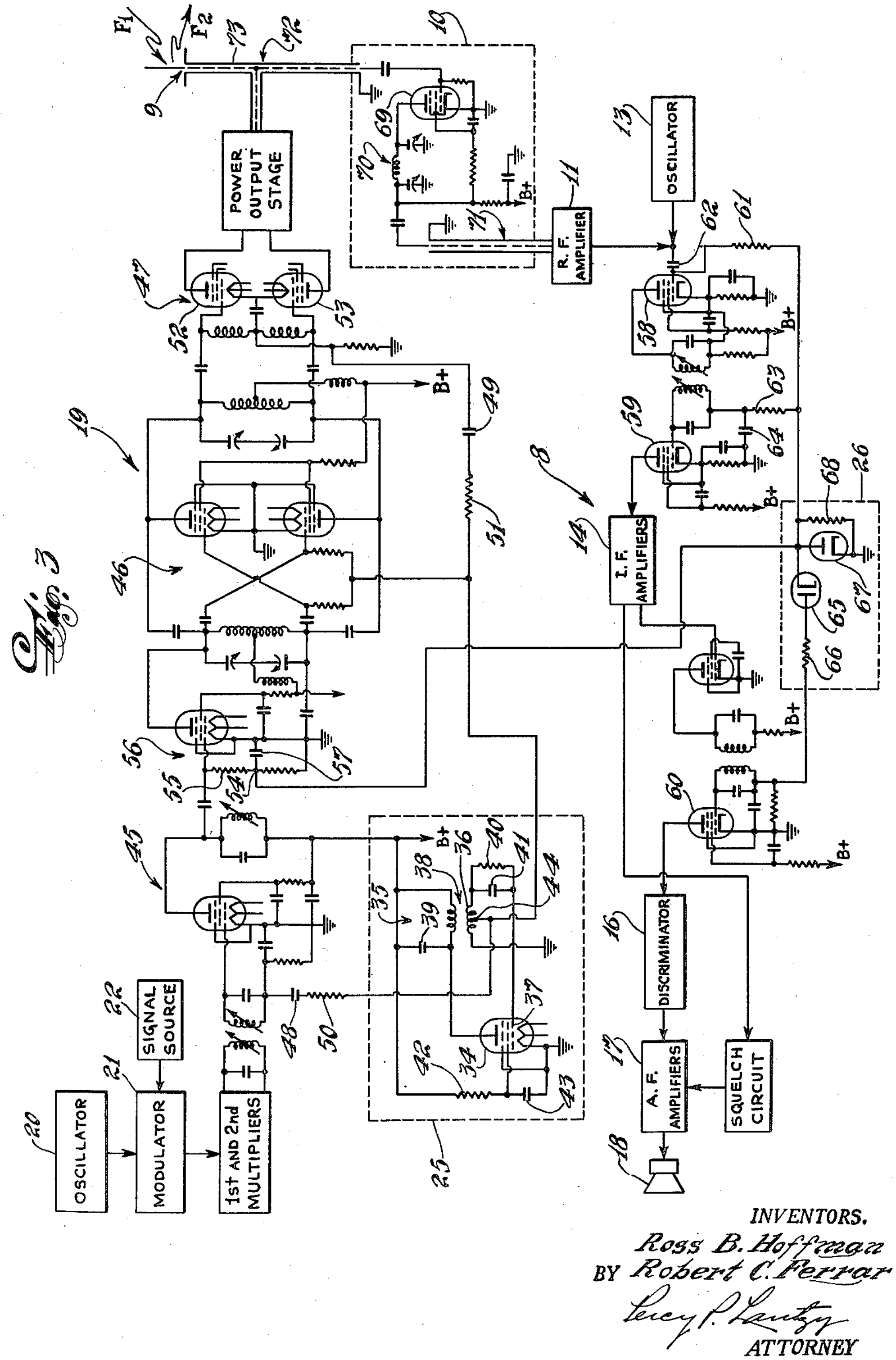
Fig. 3 is a representation of a transmitter-receiver installation in block and schematic form.

In order to obtain a better understanding of the operation of the mobile station equipment, reference should be made to Fig. 3. This figure shows the pertinent details of the frequency modulation mobile transmitter 19 and receiver 8 circuits particularly associated with the keying oscillator 25 and keying circuit 26. The keyer 25 is shown to include a single tube 34 in a tuned plate oscillator circuit including tuned circuit 35 with tickler coil 36 providing feedback to the grid 37 of the tube 34. The frequency of oscillation is determined principally by the inductance of the plate winding of transformer 38 and the capacitance of capacitor 39. The frequency preferably should be more than twice the highest voice frequency to be transmitted, a keying frequency of 8000 cycles per second being found satisfactory. Resistor 40 and capacitor 41 provide grid leak bias for the oscillator tube. Resistor 42 is the oscillator screen voltage dropping resistor, capacitor 43 being the screen bypass condenser.

From a tap 44 on the tickler winding of oscillator transformer 38, the sine wave keying voltage is applied to the grid return circuits of three of the transmitter stages. The keyed stages are the third frequency multiplier 45, the final driver 46, and the power amplifier 47. Keying voltage is applied to two of the three stages through blocking capacitors 48 and 49 and R. F. decoupling resistors 50 and 51. Keying of three transmitter stages is desirable in order to obtain complete keying of the transmitter output and to avoid leakage of signal to the antenna which might occur as the result of unneutralized grid plate capacities and incomplete keying if only one or two stages were keyed. The phase modulated carrier arriving at the third multiplier grid is therefore amplitude modulated at the keying frequency in the three keyed stages, and it is this combination of phase and amplitude modulated carrier which reaches the antenna.

Keying the grids of the power amplifier tubes 52 and 53 produces another advantage besides complete keying. In addition to the side bands produced by phase modulation of the carrier, the transmitter output includes amplitude modulation side bands separated from the carrier frequency by multiples of the keying frequency. Keying the final amplifier stage with a sine wave voltage barely large enough to cut off the final amplifier tubes in the presence of the high level signal which they receive from the driver stage produces a transmitter output wave shape which approaches sine wave amplitude modulation, as evidenced by the shape of the signal pulses of wave 32 in Fig. 2. Such an output wave shape contains a minimum number of amplitude modulation side bands with the result that no appreciable side band radiation occurs outside the assigned frequency channel. If the final amplifier were not keyed, the transmitter output would contain an intolerable number of amplitude modulation side bands of appreciable strength.

Since the keying is substantially sinusoidal, the transmitter stages will be operable for the entire positive half cycle of the keying wave and for the portion of the negative half cycle during which the keying voltage is less than the cut off value for the particular keyed stage. With the circuits shown, therefore, the transmitter duty cycle, such as 31 in Fig. 2, will exceed 50% of one transmit-receive cycle by an amount determined principally by the amplitude of the keying voltage.

Keying voltage for the double superheterodyne mobile receiver 8 is obtained from a tap 54 on the grid return resistor 55 of the fourth multiplier stage 56 in the transmitter. Since the fourth multiplier tube is supplied with a keyed signal from the third multiplier 45, the grid current of the fourth multiplier stage flows in pulses corresponding to the keying. This results in alternation of the bias voltage at the tap on the fourth multiplier grid return resistor 55 between zero and a relatively high negative value. The leading and trailing edges of this bias voltage wave form are relatively steep due to the almost square wave keyed output of the third multiplier and to the short time constant of capacitor 57 and that portion of the fourth multiplier grid return resistor between the tap 54 and ground. This keying voltage, which is approximately zero during transmitter "off" periods and negative during transmitter "on" periods, is applied as cut-off bias to the control grids of three of the receiver tubes 58, 59 and 60 in the receiver 8. Thus receiver operating periods are synchronized in the proper phase with transmitter operating periods. Keying is applied to the grid of the 1st mixer tube 58 through resistor 61, which produces a short time constant with capacitor 62, and to the first I.-F. amplifier tube 59 through decoupling resistor 63 which has a short time constant with condenser 64, to the grid of the second limiter tube 60 through keying diode 65 and decoupling registor 66. The keying diode 65 prevents the high negative bias developed by the second limiter 60 during normal operation from appearing at the grids of the other two keyed stages including tubes 58 and 59 and adversely affecting their performance. Since the time constants of all three keying circuits are short, no appreciable keying lag is introduced. Clipper diode 67 and resistor 68 in the receiver are not absolutely essential to the satisfactory performance of the system, having been added only as desirable safety features. This clipper diode prevents the grids of the keyed receiver stages from being driven positive by the keying voltage. A similar function is performed by the grid of the fourth multiplier tube 56 in the transmitter, which of course develops negative bias only and remains at approximately zero voltage during transmitter "off" periods. Resistor 68 whose value is of the order of 100,000 ohms, is a grid return resistor for the first mixer 58 and first I.-F. amplifier 59 of the receiver and acts as a load resistor for the clipper diode 67.

The mobile installation of Fig. 3 is illustrated utilizing a single antenna 9 for both transmitting and receiving. The known receiver isolating circuit 10 employs an amplifier tube 69 with an untuned high impedance input circuit and an output circuit tuned with a "pi" network 70 to match the plate impedance to the transmission line 71 between the isolating circuit and the R. F. amplifier 11. High input impedance of the isolating circuit prevents the absorption of appreciable power from the transmitter, and the self-bias in this circuit protects the tube and minimizes the power delivered to the receiver during transmitter "on" periods. A short grid time constant allows rapid recovery of the isolating circuit to a condition in which received signals are delivered to receiver 8 at the end of each transmitter "on" period.

Input to the isolating circuit 10 is obtained from a T connection 72 in the transmission line 73 between the antenna 9 and the transmitter 19. Since the input of the isolating circuit is not matched to transmission line 73, connection should be made directly at the T joint without an intervening length of cable. Standing waves exist on the transmission line between the antenna and transmitter during receiving intervals because the non-operating transmitter does not match the antenna properly. Maximum receiving sensitivity is obtained when the T joint and receiver isolating circuit are located to receive a voltage maximum during receiving periods. Other transmission line lengths are not critical, since the antenna approximately matches the transmission line impedance in the transmit condition and the transmission line between the receiver isolating circuit and the receiver proper is terminated in its characteristic impedance.

In order to prevent reproduction of noise, either internal or external, at the receiver 5 of the fixed station 1 in Fig. 1 during the time intervals between keyed signal pulses transmitted from the mobile station transmitter 19, means are preferably provided for blocking the receiver of the fixed station during those intervals when the signal pulses are not received. For this purpose, the blanking circuit 7 was shown coupled to receiver 5 in Fig. 1. This blanking circuit may, for example, be a voltage triggered device of any convenient type which will block the receiver output when the trailing edge of a received pulse occurs and which will render the receiver operative when the leading edge of a pulse is received.

Figure 4:
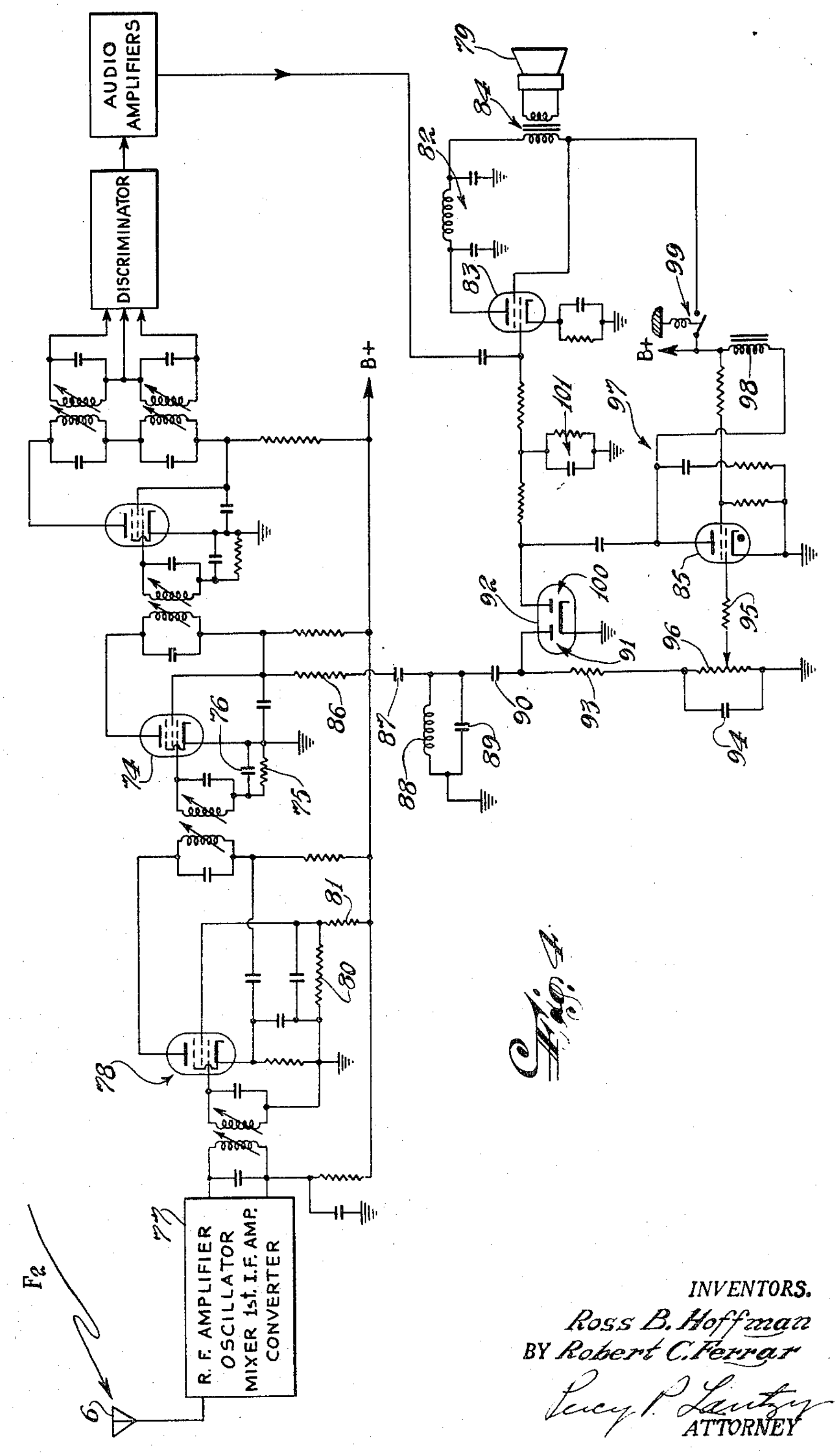
Fig. 4 is a block and schematic illustration of a receiver which may be employed to receive and reproduce signals radiated from the transmitter-receiver installation.

A double superheterodyne receiver representative of the fixed station receiver 5 in Fig. 1 is depicted in Figure 4 and includes those receiver features which are peculiar to two frequency duplex operation. The blanking circuit function is performed by the biasing arrangement in the grid circuit of the first limiter tube 74, that is, by the grid resistance 75 and grid condenser 76. The time constant of this resistance-capacitance combination is made sufficiently large so that bias voltage developed at the first limiter grid during the portion of the transmit-receive cycle when a signal is being received from the mobile transmitter 19 in Fig. 1 is substantially maintained during the portion of the cycle in which no signal is received. This bias voltage, in the absence of a received signal, reduces the receiver gain such that noise in the input circuits 77 and 78 and antenna 6 is prevented from reaching the speaker 79. The blanking action thus achieved maintains the signal to noise ratio of the receiver output at approximately the value which would be obtained were signals continuously received rather than in keyed pulses.

A "pi" section low pass filter 82 with cut-off frequency about 4,000 cycles per second has been added in the audio output circuit between the plate of the audio power amplifier tube 83 and the primary of the output transformer 84. The function of this filter is to remove the 8 kc. keying frequency and its beats with frequencies within the speech range from the receiver output. Similarly, optimum operation of the mobile station receiver 8 of Fig. 3 requires that such a filter section be included in A. F. amplifiers 17 also.

The remaining changes in the central station receiver involve the squelch circuits. The usual squelch system employed in the mobile duplex receiver and in simplex receivers does not function properly with a central station receiver receiving keyed transmissions. Consequently, another method of activating the carrier switch tube 85 in the squelch circuit is required. From the first limiter tube plate return, voltage is applied through R. F. decoupling resistor 86 and blocking capacitor 87 to a tuned circuit consisting of inductor 88 and capacitor 89. This tuned circuit discriminates against voice frequencies, being tuned to the mobile transmitter keying frequency. The voltage appearing across the tuned circuit then consists almost entirely of the mobile transmitter keying frequency, so that, in the absence of a received signal from the keyed mobile transmitter, no appreciable voltage appears across the tuned circuit. The keying frequency voltage is coupled through capacitor 90 to a shunt rectifier 91 which may consist of one of the diode elements of the double diode tube 92. The D. C. voltage thus produced is filtered by resistor 93 and capacitor 94 and is applied as D. C. bias to the grid of the carrier switch tube 85 through resistor 95 from the arm of potentiometer 96, connected across the output of the bias voltage filter. Resistor 95 minimizes the grid current in the thyratron carrier switch tube 85, thus preventing sudden changes in the bias voltage when this thyratron tube starts and stops oscillation.

During periods when a properly keyed signal is not received by the fixed station receiver, there is no high negative bias on the control grid of thyratron 85, a condition which permits the thyratron oscillator circuit 97 to oscillate. The plate current flowing through tube 85 and relay winding 98 causes relay switch 99 to open and interrupt the plate current of power output tube 83 and hence render the receiver output inaudible. The output voltage from oscillator circuit 97 is applied across the rectifier diode section 100 of tube 92 and across the resistance-capacitance network 101. Since the voltage applied to the control grid of output tube 83 from across network 101 is a large negative value when thyratron 85 is in an oscillating condition, the tube 83 will be biased to cut-off and renders the receiver output inaudible. It is, of course, possible to dispense with either relay switch 99 or the biasing system for tube 83 just described, but the proper combination of both insures that the receiver is rendered inoperative and minimizes speaker clicks.

When a keyed signal is received, a high negative control grid voltage is applied to thyratron 85 which then cannot produce oscillations. Cessation of plate current in tube 85 permits relay switch 99 to close so that plate voltage is applied to power output tube 83. No high negative control grid voltage is applied to tube 83 when thyratron 85 does not oscillate, hence the fixed station receiver is rendered fully operative.

Although the system described herein is a two frequency system in that one of the transmitters transmits a carrier frequency $F_1$ and the other transmitter transmits a somewhat different carrier frequency $F_2$, the operation of the system does not depend primarily upon filtering action, and consequently, large frequency separation between frequencies $F_1$ and $F_2$ is not required. Hence, two frequencies relatively close together in the mobile communications band may be used with satisfactory performance.

The system according to my present invention has a number of other advantages over previously known two-way systems of this general character. One advantage is that the fixed or central station equipment need not be designed for duplex operation. Accordingly, any field or mobile unit equipped for duplex operation as described hereinabove, can still operate duplex in conjunction with central or fixed station, even though the latter are set up for use with other types of mobile systems.

Another advantage over prior known systems is that the mobile unit of my invention is considerably simplified over previously known systems of the single frequency duplex type since it does not require extensive changes in the transmitter and receiver. Hence, an ordinary conventional transmitter and a conventional receiver may, for the most part, be used; and the changes required are slight since there is no requirement for synchronization with received pulses. The only slight changes required are those to adapt the apparatus for use with the keying oscillator.

It should be apparent then, that there are numerous changes which may be instituted by those skilled in the art which will produce arrangements which differ neither in spirit nor principle from those of the invention herein disclosed, and, while it has been preferred to disclose the present invention with reference to preferred embodiments, the scope of our invention should not be considered limited thereby.

We claim:

1. A radio signalling system, comprising: a main station including a transmitter operable to radiate signals on one carrier frequency and a receiver operable to receive signals on a second carrier frequency, an auxiliary station including a transmitter operable to radiate signals on said second carrier frequency and a receiver operable to receive signals on said one carrier frequency, an oscillator delivering an output of relatively low frequency compared with said one and said second carrier frequencies, means coupling the output of said oscillator to said auxiliary station transmitter to render said transmitter inoperable during a certain portion of each cycle of oscillator output voltage, and means coupling biasing voltage to said auxiliary station receiver from a point in said auxiliary station transmitter where said biasing voltage exists only during the remaining portion of each cycle, said biasing voltage being of such polarity and being applied to such receiver stages that receiver output is substantially muted thereby.

2. In a radio communication system, a transmitter operable to radiate signals on one carrier frequency and a receiver operable normally continuously to receive signals on a second carrier frequency, and means for alternately blocking the output of said transmitter and said receiver such that when signals are radiated by said transmitter said receiver is rendered inoperative and when said transmitter output is blocked said receiver is operative, and said means having further provisions whereby when said transmitter is maintained inoperative said means enables said receiver to remain operative.

3. A duplex radio communication system comprising: a first station having a transmitter operable on one carrier frequency and a receiver operable on a second carrier frequency, a second station having a transmitter operable to radiate pulses of signals of said second frequency and a receiver operable to receive pulses of signals on said one frequency, a keying oscillator associated with said second station, said oscillator being coupled to said second station transmitter and said second station receiver such that the pulsed output of signals from said second station transmitter is achieved by blocking the output from the said second station transmitter during a certain portion of each cycle of the output from said oscillator and such that the output of the said second station receiver is blocked during the remaining interval in each cycle of oscillator output, and a squelch circuit associated with said first station receiver to block the output of said receiver when pulsed signals from said second station transmitter are not received.

4. In a duplex radio communication system according to claim 3, said oscillator delivering an output relatively low in frequency compared with said carrier frequencies, and said squelch circuit associated with said first station receiver comprising a device for muting said first station receiver output actuated by the output of means responsive to the occurrence of pulses of signals of the pulse repetition frequency of signals from said second station transmitter.

5. In a radio communication system, a transmitter operable to radiate signals on a carrier frequency and a receiver operable to receive signals on another carrier frequency, an oscillator delivering an output of relatively low frequency compared with said carrier frequencies, means coupling the output of said oscillator to said transmitter to render said transmitter inoperable during a certain portion of each cycle of oscillator output voltage, and means coupling biasing voltage to said receiver from a point in said transmitter where said biasing voltage exists only during the remaining portion of each cycle, said biasing voltage being of such polarity and being applied to such receiver stages that receiver output is substantially muted thereby.

6. In a radio communication system according to claim 5, wherein the means for coupling biasing voltage to said receiver includes connections for application of said biasing voltage to a plurality of receiver stages, and a clipper diode arrangement to prevent transfer of undesired bias voltage between said receiver stages.

7. A radio signalling system, comprising: a first station including a transmitter operable to radiate signals on one carrier frequency and a receiver operable to receive signals on a second carrier frequency, a second station including a transmitter operable to radiate signals on said second carrier frequency and a receiver operable to receive signals on said one carrier frequency, an oscillator delivering an output of relatively low frequency compared with said one and said second carrier frequencies, means coupling the output of said oscillator to said second station transmitter to render said transmitter inoperable during a certain portion of each cycle of oscillator output voltage, and means coupling biasing voltage to said second station receiver from a point in said second station transmitter where said biasing voltage exists only during the remaining portion of each cycle, said biasing voltage being of such polarity and being applied to such receiver stages that receiver output is substantially muted thereby, said second station transmitter radiating frequency modulated signals and including frequency multiplier and power amplifier stages; said second station receiver being a superheterodyne receiver including mixer, intermediate frequency and limiter stages; said means coupling said oscillator output to said second station transmitter comprising connections from said oscillator to the control grids of tubes in the third and fourth multiplier stages and the power output stage; said point in said second station transmitter comprising a tap on the control grid return resistor of said fourth multiplier stage, and said means coupling voltage from said point to said second station receiver comprising connections from said point to the control grids of tubes in said mixer, intermediate frequency amplifier and limiter stages.

8. In a radio communication system, an auxiliary mobile station comprising, a transmitter operable to radiate signals on one carrier frequency and a receiver operable to receive signals on a second carrier frequency, a keying oscillator delivering an output of a relatively low frequency compared with said carrier frequency, means coupling the output of said oscillator to said transmitter to accomplish blocking of the transmitter output during a certain portion of each cycle of oscillator output, and means coupling said oscillator output to said receiver to accomplish blocking of the receiver output during the remaining portion of each cycle of oscillator output, an antenna system common to both said transmitter and said receiver, and an isolating circuit interposed between said antenna system and said receiver to minimize the power of signals radiated from said transmitter toward the input of said receiver, said isolating circuit comprising an amplifier coupled in the connection from the receiver to the common point of antenna, transmitter and receiver, said amplifier having a high impedance input at the received frequencies and an output impedance matching the receiver input.

ROSS B. HOFFMAN.
ROBERT C. FERRAR.

REFERENCES CITED

The following references are of record in the file of this patent:

UNITED STATES PATENTS

| Number | Name | Date |
|---|---|---|
| 1,433,599 | Brown | Oct. 31, 1922 |
| 1,489,158 | Schaffer | Apr. 1, 1924 |
| 2,098,286 | Garfield | Nov. 9, 1937 |
| 2,199,179 | Koch | Apr. 30, 1940 |
| 2,408,791 | Magnuski | Oct. 8, 1946 |
| 2,410,641 | Evans | Nov. 5, 1946 |
| 2,425,314 | Hansell | Aug. 12, 1947 |